(12) United States Patent
Stippich et al.

(10) Patent No.: US 8,709,115 B2
(45) Date of Patent: Apr. 29, 2014

(54) CYCLONE SEPARATORS AND SEPARATOR APPARATUSES INCLUDING THE CYCLONE SEPARATORS

(75) Inventors: Kenneth J. Stippich, Palatine, IL (US); Brian W. Hedrick, Oregon, IL (US)

(73) Assignee: UOP LLC, Des Plaines, IL (US)

( * ) Notice: Subject to any disclaimer, the term of this patent is extended or adjusted under 35 U.S.C. 154(b) by 310 days.

(21) Appl. No.: 13/328,516

(22) Filed: Dec. 16, 2011

(65) Prior Publication Data

US 2013/0152522 A1 Jun. 20, 2013

(51) Int. Cl.
*B01D 46/14* (2006.01)

(52) U.S. Cl.
USPC .................. 55/348; 55/396; 55/398; 55/456; 55/457

(58) Field of Classification Search
USPC ........... 55/392, 394, 396, 398, 399, 434, 435, 55/447, 454, 456, 457, 458; 95/34, 35, 95/267, 269
See application file for complete search history.

(56) References Cited

U.S. PATENT DOCUMENTS

| | | | |
|---|---|---|---|
| 3,643,800 A | 2/1972 | Mansson | |
| 6,261,330 B1 | 7/2001 | Dyson et al. | |
| 6,673,133 B2 * | 1/2004 | Sechrist et al. | .................. 55/348 |
| 6,797,026 B2 * | 9/2004 | Sechrist et al. | .................. 55/348 |
| 7,708,145 B2 | 5/2010 | Li et al. | |
| 2002/0144931 A1 * | 10/2002 | Sechrist et al. | ................ 208/113 |
| 2004/0079057 A1 * | 4/2004 | Sechrist et al. | .................. 55/348 |

FOREIGN PATENT DOCUMENTS

| | | |
|---|---|---|
| CN | 2577970 Y | 10/2003 |
| WO | 03066225 A1 | 8/2003 |
| WO | WO 03066225 A1 * | 8/2003 |

OTHER PUBLICATIONS

Bai, J., et al, "Dust collection efficiency analysis in a two-dimensional circulating granular bed filter," Journal of the Air and Waste Management Association, vol. 56, No. 5, p. 684-694; May 2006.

* cited by examiner

Primary Examiner — Duane Smith
Assistant Examiner — Sonji Turner
(74) Attorney, Agent, or Firm — James C Paschall

(57) ABSTRACT

Cyclone separators and separator devices for separating gas and entrained particles from a particle-contaminated gas stream are provided. The cyclone separator comprises a cyclone body having a first end and a second end with a sidewall extending therebetween. The cyclone body defines a cyclone gas inlet for receiving the particle-contaminated gas stream. A cyclone gas outlet is for discharging the clean gas stream. A centripetal accelerator is proximate the cyclone gas inlet to induce centripetal acceleration of the particle-contaminated gas stream. The sidewall defines a discharge opening between the first end and the second end for discharging separated particles from the cyclone body. The discharge opening has a leading edge and a top edge in relation to a flow path of entrained particles within the particle-contaminated gas stream. The top edge extends at an acute angle relative to the leading edge.

20 Claims, 3 Drawing Sheets

CYCLONE SEPARATORS AND SEPARATOR APPARATUSES INCLUDING THE CYCLONE SEPARATORS

TECHNICAL FIELD

The present invention generally relates to cyclone separators and separator apparatuses that include the cyclone separators, and more particularly relates to cyclone separators and separator apparatuses for separating gas and entrained particles from a particle-contaminated gas stream.

BACKGROUND

There is a general desire to control the emission of particulates in industrial gas streams in light of government regulations designed to curtail pollution. In the area of oil refinery operations, one particular area of concern regarding particulate emissions lies in the flue gas exiting catalyst regenerators of fluid catalytic cracking (FCC) units.

The FCC process, now more than 50 years old, has undergone continuous improvement and remains the predominant methodology of gasoline production in many refineries. This gasoline, as well as lighter products, is formed as the result of cracking heavier (i.e. higher molecular weight), less valuable hydrocarbon feed stocks such as gas oil. A general outline of the FCC process is provided below, although it is to be appreciated that the FCC process is a large and complex process involving many factors that are not addressed.

In its most general form, the FCC process involves use of a reactor that is closely coupled with a catalyst regenerator, followed by downstream hydrocarbon product separation. The catalyst regenerator collects spent catalyst having coke on the surface thereof, combusts the coke from the surface of the spent catalyst to refresh the catalyst, and returns the refreshed catalyst to the reactor. One specific feature of the FCC process is the continuous fluidization and circulation of large amounts of catalyst having an average particle diameter of about 50-100 microns, equivalent in size and appearance to very fine sand. For every ton of cracked product made, approximately 5 tons of catalyst are needed, thus highlighting the significance of the catalyst regenerator in the FCC process. Coupled with the need for a large inventory and recycle of a small particle diameter catalyst is the ongoing challenge to prevent this catalyst from exiting the reactor and/or catalyst regenerator system into effluent streams that are released into the environment.

Overall, the use of cyclone separators internal to both the reactor and catalyst regenerator has been developed to provide over 99% separation efficiency of solid catalyst. Regenerators generally include first and second (or primary and secondary) stage separators for the purpose of preventing catalyst contamination of regenerator flue gas, which is essentially the resulting combustion product of catalyst coke in air. While normal-sized catalyst particles are effectively removed in the first and second stage separators, fines material (generally catalyst fragments smaller than about 50 microns resulting from attrition and erosion in the harsh, abrasive reactor and catalyst regenerator environments) is substantially more difficult to separate. As a result, the regenerator flue gas may contain unacceptably high particulate concentrations, which may not only pose potential environmental concerns but which may also damage devices downstream of the regenerator flue gas.

A further reduction in regenerator flue gas fines loading is therefore often warranted, and may be obtained from a third stage separator (TSS) device containing a manifold of cyclones. Electrostatic precipitators are known to be effective for this gas/solid separation but are far more costly than a TSS, which relies on the induction of centripetal acceleration to a particle-contaminated gas stream, forcing the higher-density particles to the outer edges of a spinning vortex. To be efficient, a third stage separator device for a regenerator flue gas stream will normally contain many individual cyclone separators installed within a single vessel acting as a manifold.

In the area of cyclone design, significant emphasis has been placed on so-called "reverse flow" types where incoming gas is added around a gas outlet tube extending from the inlet side of a cylindrical cyclone body. Particle-rich gas can be withdrawn from discharge openings in the sidewall of the cyclone body, while clean gas essentially reverses flow from its initial path toward the end of the cyclone body opposite the gas inlet, back toward the gas outlet. The gas outlet is a tube normally concentric with, and located within the cyclone body. Unfortunately, the requirement by itself for a gas stream to reverse direction and exit the cyclone body on the same side as the gas inlet imposes flow disturbances that are not easily overcome.

"Uniflow" cyclone separators are known that eliminate the re-entrainment of solids associated with the reversal of gas direction. In this case, the cyclone separator is disposed between a first tube sheet and a second tube sheet, with the space between the first tube sheet and second tube sheet designed to collect separated particles. In the uniflow cyclone separators, clean gas moves continually downward and exits the cyclone body through a cyclone gas outlet that extends below the second tube sheet, which serves as the physical boundary between clean gas and the separated particles in the space between the first tube sheet and the second tube sheet. Separated particles are removed from discharge openings in the cyclone body into the space between the first tube sheet and the second tube sheet.

Variations in the design of uniflow cyclone separators have involved modification to the cyclone gas outlet as well as modification to the discharge opening configuration to promote uniform flow patterns within the cyclone body. For example, beveled edges of the discharge openings have been proposed to align the discharge openings with a flow path of entrained particles within the particle-contaminated gas stream. However, discharge openings of existing cyclone separators are still subject to design flaws due to their shape. In particular, existing discharge openings are generally rectangular in shape. Entrained particles uniformly impact a lagging edge of the discharge openings in relation to a flow path of entrained particles within the particle-contaminated gas stream, often resulting in erosion of the lagging edge and leading to widening of the discharge openings. Widening of the discharge openings is undesirable due to the effect of such widening on flow patterns within the cyclone body.

Accordingly, it is desirable to provide cyclone separators having a discharge opening that is redesigned to minimize erosion and address issues with widening of the discharge openings due to erosion. In addition, it is desirable to provide separator devices including the cyclone separators having the redesigned discharge opening. Furthermore, other desirable features and characteristics of the present invention will become apparent from the subsequent detailed description of the invention and the appended claims, taken in conjunction with the accompanying drawings and this background of the invention.

BRIEF SUMMARY

Cyclone separators and separator devices for separating gas and entrained particles from a particle-contaminated gas stream are provided. In an embodiment, a cyclone separator comprises a cyclone body having a first end and a second end with a sidewall extending between the first end and the second end. The cyclone body defines a cyclone gas inlet for receiving the particle-contaminated gas stream. A cyclone gas outlet is for discharging a clean gas stream from the cyclone separator. A centripetal accelerator is located proximate to the cyclone gas inlet to induce centripetal acceleration of the particle-contaminated gas stream. The sidewall of the cyclone body defines a discharge opening located between the first end and the second end for discharging separated particles from the cyclone body. The discharge opening has a leading edge and a top edge in relation to a flow path of entrained particles within the particle-contaminated gas stream. The top edge extends at an acute angle relative to the leading edge.

In another embodiment, a cyclone separator comprises a cyclone body that is substantially cylindrical in shape. The cyclone body has a first end and a second end with a sidewall extending between the first end and the second end. The cyclone body defines a cyclone gas inlet located adjacent to the first end for receiving the particle-contaminated gas stream. A cyclone gas outlet is located adjacent to the second end for discharging a clean gas stream from the cyclone separator. A centripetal accelerator is located proximate to the cyclone gas inlet to induce centripetal acceleration of the particle-contaminated gas stream. The sidewall of the cyclone body defines a discharge opening located between the first end and the second end for discharging separated particles from the cyclone body. The discharge opening has a leading edge, a top edge, and a trailing edge in relation to a flow path of entrained particles within the particle-contaminated gas stream. The top edge extends at an angle of from about 70° to about 87° relative to the leading edge. The trailing edge extends at an obtuse angle to the top edge, and the trailing edge is substantially parallel to the leading edge.

In another embodiment, a separator device comprises a vessel that has a vessel inlet for receiving a particle-contaminated gas stream that comprises gas and entrained particles. The vessel also has a vessel gas outlet for discharging a clean gas stream. The vessel also has a vessel particle outlet for discharging separated particles. A first tube sheet is disposed within the vessel located proximate to the vessel inlet. The first tube sheet defines a particle-contaminated gas section within the vessel and the particle-contaminated gas section is in fluid communication with the vessel inlet. A second tube sheet is disposed within the vessel, and the second tube sheet is spaced from the first tube sheet on an opposite side of the first tube sheet from the vessel inlet. The second tube sheet defines a clean gas section within the vessel. The clean gas section is in fluid communication with the vessel gas outlet. The first tube sheet and the second tube sheet define a separated particle section between the first tube sheet and the second tube sheet. The separated particle section is isolated from the vessel inlet and the vessel gas outlet. A cyclone separator is disposed between the first tube sheet and the second tube sheet. The cyclone separator includes a cyclone body. The cyclone body has a first end and a second end with a sidewall extending between the first end and the second end. The cyclone body defines a cyclone gas inlet that extends through the first tube sheet and that is located adjacent to the first end for receiving the particle-contaminated gas stream. A cyclone gas outlet is located adjacent to the second end for discharging the clean gas stream from the cyclone separator through the second tube sheet. A centripetal accelerator is located proximate to the cyclone gas inlet to induce centripetal acceleration of the particle-contaminated gas stream. The sidewall of the cyclone body defines a discharge opening located between the first end and the second end for discharging separated particles from the cyclone body into the separated particle section of the vessel. The discharge opening has a leading edge and a top edge in relation to a flow path of entrained particles within the particle-contaminated gas stream. The top edge extends at an acute angle relative to the leading edge.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
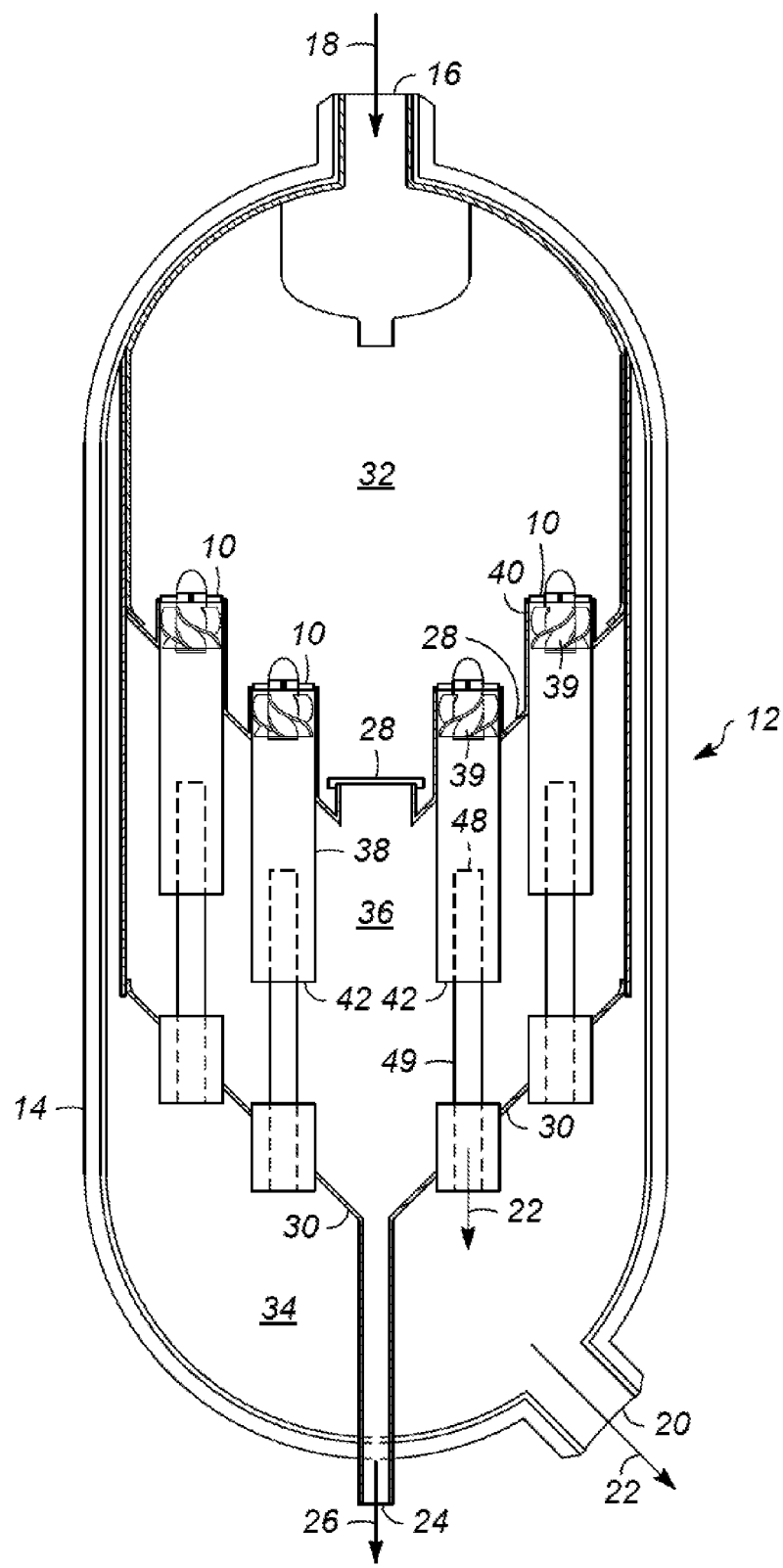
FIG. 1 is a schematic cross-sectional side view of a separator device including a plurality of cyclone separators in accordance with an exemplary embodiment.
Figures 2, 3:
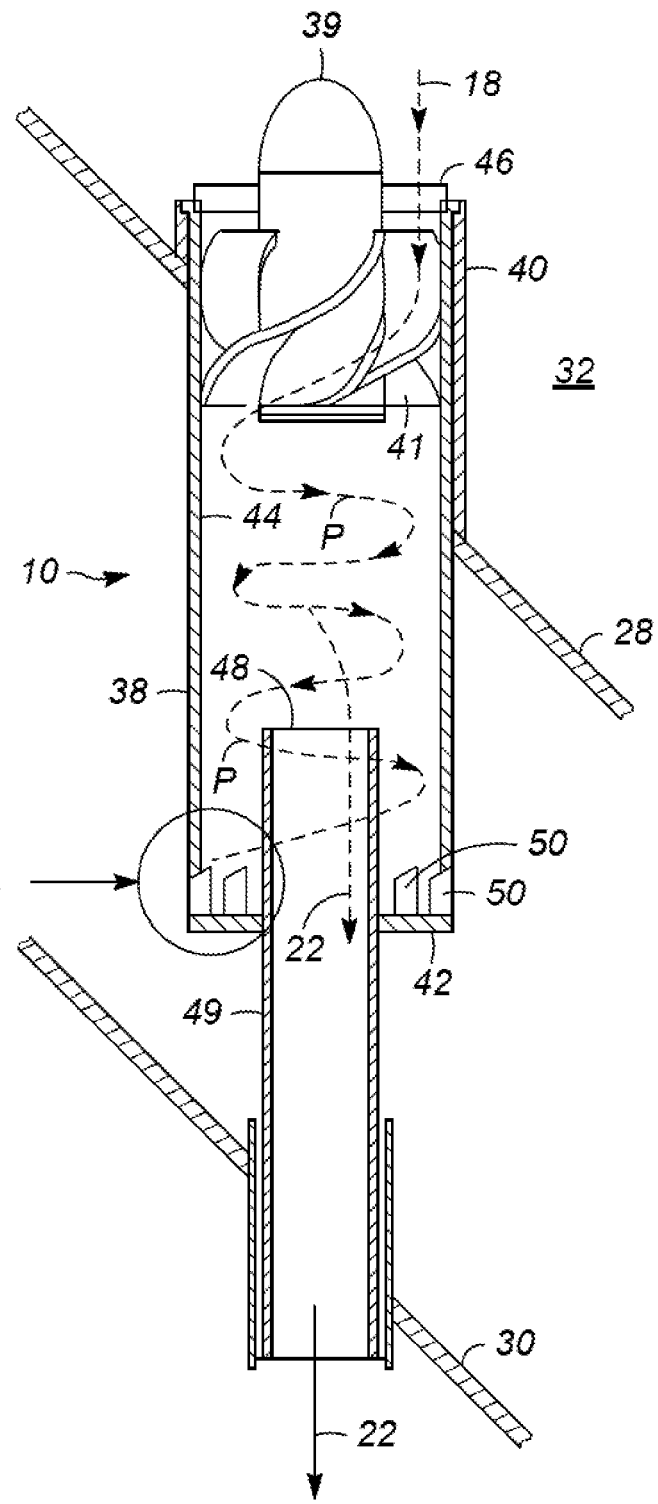
FIG. 2 is a schematic cross-sectional side view of a cyclone separator in accordance with an exemplary embodiment.
FIG. 3 is a partial schematic cross-sectional side view of a portion of the cyclone separator of FIG. 2 showing a plurality of discharge openings.
Figure 3:
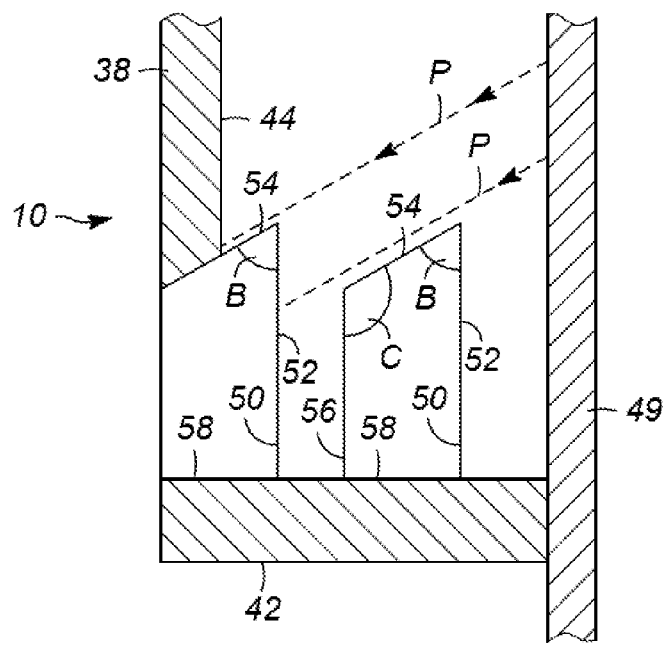

Cyclone separators and separator devices for separating gas and entrained particles from a particle-contaminated gas stream are provided herein, exemplary embodiments of which are shown in FIG. 1 and FIG. 2, respectively at 10 and 12. The cyclone separators 10 and separator devices 12 are particularly useful in third stage separation steps in fluid catalytic cracking (FCC) processes, for separating catalyst fines from regenerator flue gas. However, cyclone separators 10 and separator devices 12 provided herein may be employed to separate particles from a broad range of particle-contaminated gas streams, and especially those containing dust particles in the 1-10 μm range. For example, in addition to use in FCC processes, and without intending to be limiting, the cyclone separators 10 and separator devices 12 may be used in other solid catalyst fluidized bed processes, coal fired heaters, and power plants.

In an embodiment, as shown in FIG. 1, the cyclone separator 10 is included in the separator device 12. In particular, the separator device 12 includes a vessel 14 that has a vessel inlet 16 for receiving a particle-contaminated gas stream 18 that includes gas and entrained particles. The particle-contaminated gas stream 18 may be provided from a variety of sources, such as the processes that are described above. In one particular embodiment, the particle-contaminated gas stream 18 is regenerator flue gas provided from a regenerator in a FCC process. The vessel 14 also includes a vessel gas outlet 20 for discharging a clean gas stream 22, after separation of the particles therefrom by the cyclone separator 10. The clean gas stream 22 may be fed to a turbine (not shown) to recover energy therefrom. The vessel 14 also includes a vessel particle outlet 24 for discharging separated particles 26. In an embodiment, when the particle-contaminated gas stream 18 is regenerator flue gas provided from a regenerator in a FCC process, the separated particles 26 are catalyst particles that may be recovered for further use, or that may be collected and properly disposed of.

In an embodiment, as also shown in FIG. 1, the separator device 12 includes a first tube sheet 28 that is disposed within the vessel 14 proximate to the vessel inlet 16 and a second tube sheet 30 that is also disposed within the vessel 14 and that is spaced from the first tube sheet 28 on an opposite side thereof from the vessel inlet 16. The first tube sheet 28 and the second tube sheet 30 extend across the diameter of the vessel 14 and about the circumference thereof. The first tube sheet 28 defines a particle-contaminated gas section 32 within the vessel 14, with the particle-contaminated gas section 32 in fluid communication with the vessel inlet 16 for receiving the particle-contaminated gas stream 18 from the vessel inlet 16. The second tube sheet 30 defines a clean gas section 34 within the vessel 14, with the clean gas section 34 in fluid communication with the vessel gas outlet 20. The first tube sheet 28 and the second tube sheet 30 define a separated particle section 36 therebetween that is isolated from the vessel inlet 16 and the vessel gas outlet 20. In particular, the particle-contaminated gas section 32 is isolated from the separated particle section 36 by the first tube sheet 28 and the clean gas section 34 is isolated from the separated particle section 36 by the second tube sheet 30. In this embodiment, the cyclone separator 10 is disposed between the first tube sheet 28 and the second tube sheet 30, with fluid flow between the various sections 32, 34, 36 regulated by the cyclone separator 10 as described in further detail below. As shown in FIG. 1, the separator device 12 may include a plurality of cyclone separators 10 to maximize the amount of particle-contaminated gas stream 18 that can be processed by the separator device 12. For example, the separator device 12 may include from about 8 to about 200 cyclone separators. Thus, the vessel 14 may act as a manifold to provide the particle-contaminated gas stream 18 to the plurality of cyclone separators 10, and may further act to gather separated particles 26 and clean gas stream 22 from the plurality of cyclone separators 10 for feeding to other devices.

Referring to FIG. 2, the cyclone separator 10 includes a cyclone body 38 and a centripetal accelerator 39. In an embodiment, the cyclone body 38 is substantially cylindrical in shape to promote the formation of a vortex of the particle-contaminated gas stream 18 therein. However, it is to be appreciated that the shape of the cyclone body 38 is not particularly limited and that other shapes are possible so long as a vortex of the particle-contaminated gas stream 18 may be formed therein. The centripetal accelerator 39 induces centripetal acceleration of the particle-contaminated gas stream 18 within the cyclone body 38. In this regard, the centripetal accelerator 39 can be any device or combination of devices that induces the centripetal acceleration of the particle-contaminated gas stream 18 within the cyclone body 38. For example, as shown in FIG. 2, the centripetal accelerator 39 can include a swirl vane 41 that induces centripetal acceleration of the particle-contaminated gas stream 18 through rotation. As another example, jets (not shown) may be used to induce centripetal acceleration of the particle-contaminated gas stream 18. Centripetal acceleration of the particle-contaminated gas stream 18 creates a vortex of the particle-contaminated gas stream 18 within the cyclone body 38. Formation of the vortex, and the associated centripetal acceleration that is induced by the centripetal accelerator 39, enables particle separation due to migration of particles toward the edges of the vortex, with gas migrating toward the center of the vortex.

The cyclone body 38 has a first end 40 and a second end 42 with a sidewall 44 extending between the first end 40 and the second end 42. The cyclone body 38 defines a cyclone gas inlet 46, which may be located adjacent to the first end 40, for receiving the particle-contaminated gas stream 18 that includes the entrained particles. The centripetal accelerator 39 is located proximate to the cyclone gas inlet 46. When included in the separator device 12 as described above and as shown in FIG. 1, the cyclone body 38 defines the cyclone gas inlet 46 extending through the first tube sheet 28. In this regard, the first end 40 of the cyclone body 38 may extend into the particle-contaminated gas section 32 for drawing particle-contaminated gas stream 18 into the cyclone separator 10 through operation of the centripetal accelerator 39.

The cyclone body 38 also defines a cyclone gas outlet 48, which may be located adjacent to the second end 42, for discharging the clean gas stream 22 from the cyclone separator 10. In this regard, when included in the separator device 12 as described above and as shown in FIG. 1, the cyclone body 38 defines the cyclone gas outlet 48 for discharging the clean gas stream 22 from the cyclone separator 10 through the second tube sheet 30. In an embodiment, the cyclone gas outlet 48 may simply be an extension of the cyclone body 38, with the second end 42 of the cyclone body 38 extending through the second tube sheet 30. In another embodiment, as shown in FIG. 2, the cyclone body 38 defines the cyclone gas outlet 48 at an outlet tube 49 that is separate from or is integral with the cyclone body 38. In this embodiment, the outlet tube 49 extends into the cyclone body 38 and is centrally located within the cyclone body 38, i.e., near the center of the vortex of the particle-contaminated gas stream 18 formed in the cyclone body 38. The outlet tube 49 also extends through the second tube sheet 30. With the central location of the cyclone gas outlet 48 within the cyclone body 38, the clean gas stream 22 flows through cyclone gas outlet 48 due to the migration of gas toward the center of the vortex. While the clean gas stream 22 may still contain some entrained particles, most of the entrained particles of the particle-contaminated gas stream 18 are separated therefrom due to migration of the particles toward the edge of the vortex and away from the cyclone gas outlet 48.

Figure 4:
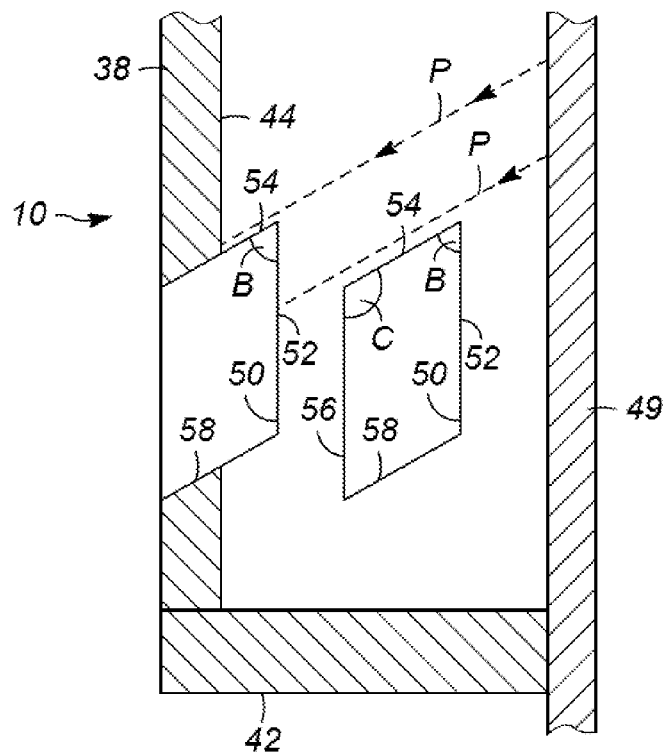
FIG. 4 is a partial schematic cross-sectional side view of a portion of a cyclone separator in accordance with another embodiment showing another embodiment of discharge openings.

As shown in FIG. 2, and as shown in greater detail in FIGS. 3 and 4, the sidewall 44 of the cyclone body 38 defines a discharge opening 50 located between the first end 40 and the second end 42 for discharging separated particles 26 from the cyclone body 38. In an embodiment, the sidewall 44 of the cyclone body 38 defines a plurality of discharge openings 50 that are perimetrically spaced about the cyclone body 38. The discharge opening 50 may be located proximate the second end 42 of the cyclone body 38, where separation between the entrained particles and the clean gas stream 22 may be more pronounced than at locations in the cyclone body 38 that are closer to the first end 40.

The discharge opening 50 has a leading edge 52 and a top edge 54 in relation to a flow path P of entrained particles within the particle-contaminated gas stream 18. More specifically, due to formation of the vortex, as described above, the flow path P of entrained particles within the particle-contaminated gas stream 18 is generally established in a spiral shape. The leading edge 52 generally extends in a transverse relationship relative to the flow path P of the entrained particles and, thus, generally extends in the direction of the first end 40 and second end 42 of the cyclone body 38. While the leading edge 52 is generally the first edge of the discharge opening 50 that the entrained particles in the flow path P encounter relative to a horizontal component of the flow path P, the spiral shape of the flow path also gives the flow path P a vertical component. As such, some entrained particles in the flow path P first encounter the top edge 54 of the discharge opening 50.

Due to the formation of the vortex, the flow path P of the entrained particles is generally tangential to the discharge opening 50 within the cyclone body 38. As such, once the entrained particles in the flow path P encounter the leading edge 52 (or the top edge 54), all entrained particles do not generally flow straight out of the cyclone body 38 through the discharge opening 50. Rather, due to the tangential flow of the entrained particles in the flow path P, entrained particles tend to impinge on edges of the discharge opening 50 that are downstream of the leading edge 52 in the flow path P. In this regard, the configuration of edges of the discharge opening 50 downstream of the leading edge 52 also affects flow of the entrained particles through the discharge opening 50. As best shown in FIG. 3, the top edge 54 of the discharge opening 50 extends at an acute angle B relative to the leading edge 52. Without being bound to any particular theory, it is believed that rectangular-shaped discharge openings (i.e., openings having a leading edge, a trailing edge parallel to the leading edge, and a top edge connecting the leading edge and the trailing edge with the top edge extending at 90° to the leading and trailing edges) are prone to erosion and degradation due to impingement of the entrained particles in the particle-contaminated gas stream with the trailing edge and, particularly, due to impingement of the entrained particles in the particle-contaminated gas stream and a corner between the trailing edge and the top edge of the discharge openings. By providing the discharge opening 50 with the top edge 54 that extends at the acute angle B relative to the leading edge 52, it is believed that a longer exit path is provided that will reduce impingement of entrained particles and alleviate erosion of the trailing edge that is experienced in rectangular-shaped discharge openings. In particular, with the angled top edge 54, entrained particles can begin to exit the discharge opening 50 prior to reaching the trailing edge 56 (if a trailing edge 56 separate from the top edge 54 is even present). In this regard, the amount of entrained particles that contact the trailing edge 56 can be reduced as compared to the relative amount of entrained particles that would contact a trailing edge of a rectangular-shaped discharge opening having a similar open area.

In an embodiment, the top edge 54 of the discharge opening 50 extends at an acute angle B of from about 70° to about 87° relative to the leading edge 52, which generally aligns the top edge 54 with the flow path P of the particle-contaminated gas stream 18. In an embodiment, as shown in FIG. 3, the discharge opening 50 has a trailing edge 56 that extends at an obtuse angle C relative to the top edge 54 and that is substantially parallel to the leading edge 52. In this embodiment, the discharge opening 50 may have a trapezoid shape, with the leading edge 52 and the trailing edge 56 being generally parallel. However, although not shown, it is to be appreciated that the trailing edge 56 may be absent and that the top edge 54 may extend an entire length of the discharge opening 50 (thereby resulting in a triangular shape of the discharge opening 50). As shown in FIGS. 2 and 3, the discharge opening 50 may extend to the second end 42 of the cyclone body 38, with a bottom edge 58 of the discharge opening 50 adjacent the second end 42 of the cyclone body 38. In this embodiment, the bottom edge 58 may be generally perpendicular to the leading edge 52 and, when present, the trailing edge 56. In another embodiment, as shown in FIG. 4, the discharge opening 50 has a bottom edge 58 that is spaced from the second end 42 of the cyclone body 38. In this embodiment, the bottom edge 58 may be substantially parallel to the top edge 54. However, it is expected that the benefits associated with the angled top edge 54 may not be as significant for the bottom edge 58 due to the flow path P of the entrained particles. In particular, less entrained particles will likely be present in the flow path P of the particle-contaminated gas stream 18 that reaches the bottom edge 58 of the discharge opening 50 than are present in the flow path P of the particle-contaminated gas stream 18 at the top edge 54 such that impingement of entrained particles on the trailing edge 56 near the bottom edge 58 is less of a concern than near the top edge 54.

The open area of individual discharge openings 50, as well as the total surface area of all discharge openings 50 in the cyclone body 38, may be subject to various design considerations such as flow rate of the particle-contaminated gas stream 18, particle size of entrained particles in the particle-contaminated gas stream 18, particle content of the particle-contaminated gas stream 18, diameter of the cyclone body 38, and various other considerations as known in the art. In an embodiment, when the cyclone body 38 defines the plurality of discharge openings 50, the plurality of discharge openings 50 have a total open area from about 0.05% to about 5% of a surface area of the cyclone body 38, which enables efficient separation of the clean gas stream 22 and the entrained particles.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A cyclone separator for separating gas and entrained particles from a particle-contaminated gas stream, said cyclone separator comprising:
   a cyclone body having a first end and a second end with a sidewall extending therebetween, said cyclone body defining a cyclone gas inlet for receiving the particle-contaminated gas stream and a cyclone gas outlet for discharging a clean gas stream from said cyclone separator;
   a centripetal accelerator proximate said cyclone gas inlet to induce centripetal acceleration of the particle-contaminated gas stream;
   wherein said sidewall of said cyclone body defines a discharge opening located between said first end and said second end for discharging separated particles from said cyclone body, said discharge opening having a leading edge and a top edge in relation to a flow path of entrained particles within the particle-contaminated gas stream, and wherein said top edge extends at an acute angle relative to said leading edge.

2. The cyclone separator of claim 1, wherein said top edge of said discharge opening extends at an angle of from about 70° to about 87° relative to said leading edge.

3. The cyclone separator of claim 1, wherein said discharge opening has a trailing edge extending at an obtuse angle to the top edge and substantially parallel to said leading edge.

4. The cyclone separator of claim 1, wherein said discharge opening extends to said second end of said cyclone body.

5. The cyclone separator of claim 1, wherein said discharge opening has a bottom edge spaced from said second end of said cyclone body, and wherein said bottom edge is substantially parallel to said top edge.

6. The cyclone separator of claim 1, wherein said sidewall of said cyclone body defines a plurality of discharge openings.

7. The cyclone separator of claim 6, wherein said plurality of discharge openings have a total open area from about 0.05% to about 5% of a surface area of said cyclone body.

8. The cyclone separator of claim 1, wherein said cyclone body is substantially cylindrical in shape.

9. The cyclone separator of claim 1, wherein said centripetal accelerator comprises a swirl vane.

10. A cyclone separator for separating gas and entrained particles from a particle-contaminated gas stream, said cyclone separator comprising:
 a cyclone body substantially cylindrical in shape and having a first end and a second end with a sidewall extending therebetween, said cyclone body defining a cyclone gas inlet adjacent said first end for receiving the particle-contaminated gas stream and a cyclone gas outlet adjacent said second end for discharging a clean gas stream from said cyclone separator;
 a centripetal accelerator proximate said cyclone gas inlet to induce centripetal acceleration of the particle-contaminated gas stream;
 wherein said sidewall of said cyclone body defines a discharge opening located between said first end and said second end for discharging separated particles from said cyclone body, said discharge opening having a leading edge, a top edge, and a trailing edge in relation to a flow path of entrained particles within the particle-contaminated gas stream, and wherein said top edge extends at an angle of from about 70° to about 87° relative to said leading edge and said trailing edge extends at an obtuse angle to said top edge and substantially parallel to said leading edge.

11. A separator device comprising:
 a vessel having a vessel inlet for receiving a particle-contaminated gas stream comprising gas and entrained particles, a vessel gas outlet for discharging a clean gas stream, and a vessel particle outlet for discharging separated particles;
 a first tube sheet disposed within said vessel proximate to said vessel inlet and defining a particle-contaminated gas section within said vessel, said particle-contaminated gas section in fluid communication with said vessel inlet;
 a second tube sheet disposed within said vessel spaced from said first tube sheet opposite said vessel inlet and defining a clean gas section within said vessel, said clean gas section in fluid communication with said vessel gas outlet,
 wherein said first tube sheet and said second tube sheet define a separated particle section therebetween isolated from said vessel inlet and said vessel gas outlet; and
 a cyclone separator for separating gas and entrained particles from the particle-contaminated gas stream, said cyclone separator disposed between said first tube sheet and said second tube sheet and comprising:
  a cyclone body having a first end and a second end with a sidewall extending therebetween, said cyclone body defining a cyclone gas inlet extending through said first tube sheet adjacent said first end for receiving the particle-contaminated gas stream comprising the entrained particles and a cyclone gas outlet adjacent said second end for discharging the clean gas stream from said cyclone separator through said second tube sheet;
  a centripetal accelerator proximate said cyclone gas inlet to induce centripetal acceleration of the particle-contaminated gas stream;
  wherein said sidewall of said cyclone body defines a discharge opening located between said first end and said second end for discharging entrained particles from the particle-contaminated gas stream into said separated particle section of said vessel, said discharge opening having a leading edge and a top edge in relation to a flow path of entrained particles within the particle-contaminated gas stream, and wherein said top edge extends at an acute angle relative to said leading edge.

12. The separator device of claim 11, wherein said top edge of said discharge opening extends at an angle of from about 70° to about 87° relative to said leading edge.

13. The separator device of claim 11, wherein said discharge opening has a trailing edge extending at an obtuse angle to said top edge and substantially parallel to said leading edge.

14. The separator device of claim 11, wherein said discharge opening extends to said second end of said cyclone body.

15. The separator device of claim 11, wherein said discharge opening has a bottom edge spaced from said second end of said cyclone body, and wherein said bottom edge is substantially parallel to said top edge.

16. The separator device of claim 11, wherein said sidewall of said cyclone body defines a plurality of discharge openings.

17. The separator device of claim 16, wherein said plurality of discharge openings have a total open area from about 0.05% to about 5% of a surface area of said cyclone body.

18. The separator device of claim 11, wherein said cyclone body is substantially cylindrical in shape.

19. The separator device of claim 11, wherein said centripetal accelerator comprises a swirl vane.

20. The separator device of claim 11, comprising a plurality of cyclone separators.

* * * * *